July 1, 1930. W. R. PETERSON 1,768,993
HARROW
Filed Dec. 24, 1928    2 Sheets-Sheet 1
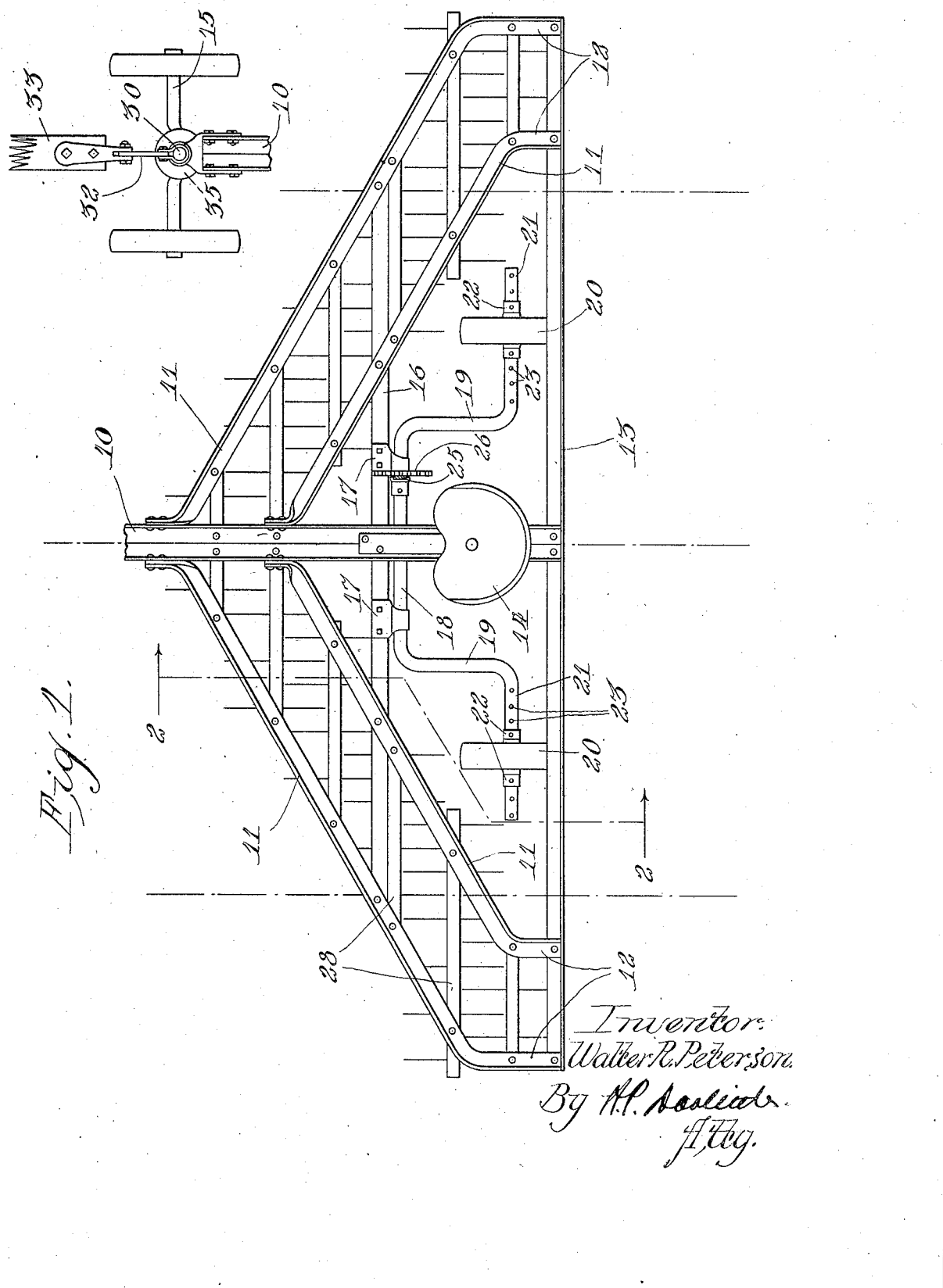

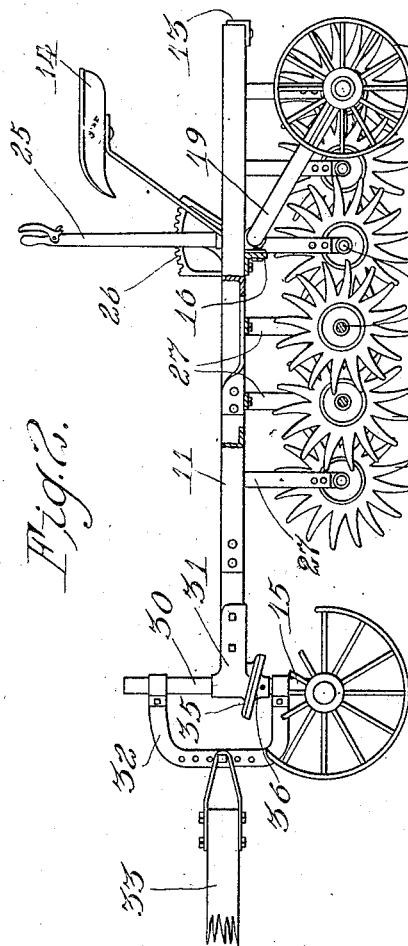

Patented July 1, 1930

1,768,993

UNITED STATES PATENT OFFICE

WALTER R. PETERSON, OF PARK RIDGE, ILLINOIS, ASSIGNOR TO INTERNATIONAL HARVESTER COMPANY, A CORPORATION OF NEW JERSEY

HARROW

Application filed December 24, 1928. Serial No. 328,160.

The present invention relates to tillage implements and particularly to construction of harrows and cultivators of the wide or multiple row type.

The objects of the invention are to provide a wider tillage implement of the class above stated than heretofore in common use, and one capable of working the soil over a transverse path corresponding to a width ordinarily required for three or more plant rows, and to so construct the implement as to make it capable of being turned easily to right or left without dragging the soil engaging elements thereon sidewise through the soil to an objectionable degree.

The foregoing objects as well as other objects and advantages, which will become apparent from the following description, have been attained by provision of a novel frame structure of wide spread triangular, or V-shape, having soil working tools mounted on it throughout its lateral extent and including novel construction and arrangement of ground engaging supports for the frame embodying means for raising the frame and tools when the harrow is to be turned. A structure embodying the invention is hereinafter specifically described and is illustrated in the accompanying drawings, wherein:

Figure 1 is a plan view, given in two sections for lack of space, showing a rotary harrow embodying the novel construction;

Figure 2 is a side elevation, with parts in section on the line 2—2 of Figure 1, of the horrow shown in Figure 1;

Figure 3 is an enlarged detail view of a portion of the front support or steering truck;

Figure 4 is a side view similar to Figure 2, but showing a modified construction of parts of the steering truck; and, Figure 5 is an enlarged detail view of a portion of the modified truck.

The principle of the invention is particularly well adapted for employment in the construction of implements of the so-called rotary hoe type, and, in the present instance, the invention is disclosed as embodied in the construction of a wide, or three row, rotary hoe. This construction preferably consists of a central draft or tongue member 10 shown as comprising twin angle iron members. Intermediate the ends of this central member there are connected thereto at opposite sides thereof, rearwardly diverging members 11, which are preferably two in number at each side and disposed in parallel relation, these members terminating at the rear in longitudinally extending, short, parallel ends 12 connected by a transverse bar or member 13. The central member 10 extends forwardly and rearwardly beyond the plate of connection of the divergent members 11, the rear end of the central member being preferably secured to the transverse bar 13. A driver's seat 14 may be provided on the rear portion of member 10. At its forward end, the central member or tongue 10 is carried on a ground engaging support or truck 15, which will be hereinafter more particularly described. Intermediate the ends of the divergent members 11, there is a transverse connecting member 16, which is secured to the divergent members and to the central member 10. The transverse member 16 is provided with journal brackets 17 at opposite sides of the central member 10, and these brackets carry the middle transverse portion of a cranked axle 18, the cranks 19 of which extend rearwardly within the space enclosed by the divergent members 11 and the rear transverse bar 13. The cranks 19 have carrying wheels 20 journaled thereon in a manner to permit lateral adjustment of the wheels on the transversely aligned spindle ends 21 of the cranks 19. The lateral adjustment may be provided by stop collars 22 on each side of each wheel 20, which may be fixed at desired location on the spindles 21 by means of set screws engaging notches or depressions 23 in the spindles, as illustrated in Figure 1. Means, such as a hand lever 25 secured to the crank axle and a cooperating rack 26 on the frame, is preferably provided for adjustment of the crank axle to vary the height of the rear portion of the frame above the soil and regulate the working depth of the tools carried thereby. On the divergent members at each side and throughout the whole extent thereof there are provided transversely aligned hangers 27 at regularly spaced points from front to rear of said members. These hangers carry a succession of parallel shafts 28. The first two shafts extend across the apex of the frame, as seen in Figure 1, and succeeding shafts on the divergent members of the frame are arranged in parallel, stepped relation in the manner clearly illustrated. The respective shafts have mounted thereon gangs of rotary hoes, or pronged wheels, 29, of the type more clearly illustrated in Figures 2 and 4, and the spacing of the shafts, and the size of the wheels, is such that the rotary hoes on succeeding shafts will be disposed in staggered and overlapped relation. The arrangement of the shafts and hoes is such that the soil will be subjected to the action of two gangs of hoes throughout the width of the harrow.

In the construction in Figures 1, 2 and 3, the truck 15 supporting the forward end of the central member 10 comprises a vertical standard 30, which is swiveled in a bearing bracket 31 on the forward end of the central member 10, and this standard carries the usual forwardly extending draft clevis 32, to which a drawbar 33 is suitably connected in a manner to cause turning movement of the standard 30 and the truck upon horizontal, angular change of direction of the drawbar 33. In order to cause vertical movement of the forward end of the central bar 10 upon the standard 30 when turning movement is given that standard, the bearing bracket 31 is provided at its under side with a fixed cam plate 35. In the present instance, this is shown as a disk-like plate having an under face inclined from front to rear on a line oblique to the axis of the standard 30. Beneath this cam plate 35 the standard 30 has secured thereto a complemental cam plate 36, on which the cam plate 35 normally rests. When the direction of draft changes and the standard 30 is turned to right or left, the opposed faces on the cam plates 35 and 36 will ride upon each other and become spread, as illustrated in Figure 3, with corresponding lifting of the forward end of the central member and, therefore, of the frame as a whole, which is thereby tilted on the axis of the rear wheels 20. The range of lifting movement imparted by the cams 35, 36 is sufficient to raise the rotary hoes on the forward half of the implement out of the soil and all but the rearmost hoes partly out, thereby making it possible to turn the harrow about a central, vertical axis between its rear wheels, or on either wheel as a pivot, without dragging the forward hoes laterally through the soil on an arc about the axis of the turn.

In lieu of the automatic front lift for the frame above described there may be provided a hand lever 38 adjacent the seat 13 and connected by a link 39 to a bell crank 40 on the upper end of the standard 30, as illustrated in Figures 4 and 5. The other arm of the bell crank 40 may be connected, as by a link 41, to the bearing bracket 31 on the central member 10. The lever 38 cooperates with the usual rack 42 and, therefore, can be adjusted to lift and lower the forward end of the frame during a turn and also to level the frame.

The construction and arrangement of parts above described, therefore, exemplifies a harrow structure in which there is embodied means for automatically lifting the forward end of a wide V-shaped frame upon turning movement of the harrow, thereby facilitating turning movement and obviating the objectionable lateral dragging of the implements through the soil, which would otherwise occur. The structure also exemplifies a type of wide, rotary hoe which will efficiently operate over the width of three or more plant rows and which is simple in construction and easy to control.

What is claimed is:

1. The combination of a frame comprising rearwardly divergent members, a central longitudinal member to which the forward ends of the divergent members are connected, the central member extending forwardly and rearwardly beyond the place of connection, a truck including a vertical standard swiveled on the forwardly projecting end of the central member, means between said truck and central member for causing vertical movement of said member with respect to the truck upon turning movements of the standard, a wheeled support on the rear portion of the central member, a succession of parallel shafts carried by the divergent members, and rotary tillage tools carried by said shafts.

2. The combination of a frame comprising rearwardly divergent members, a central longitudinal member to which the forward ends of the divergent members are connected, the central member extending forwardly of the place of connection, a steering truck on the forward end of the central member, supporting wheels at the rear of the frame, and tillage tools carried by the divergent members comprising a succession of parallel transversely extending shafts mounted under the divergent members from end to end thereof, and gangs of toothed wheels mounted on said shafts.

3. The combination of a frame comprising rearwardly divergent members, a central longitudinal member to which the forward ends of the divergent members are connected, a truck including a vertical standard swiveled on the forward end of the central member, means between said truck and central member for causing vertical movement of said member with respect to the truck upon turning movements of the standard, means for supporting the rear ends of the divergent members, a succession of parallel shafts carried by the divergent members, and rotary tillage tools carried by said shafts.

4. A tillage implement comprising a V-shaped frame having a rigid draft tongue at its apex, tillage tools carried on the arms of the frame, supporting wheels at the base of the frame journaled on a common transverse axis, a steering truck having a vertical standard swiveled on the draft tongue, and complemental opposite cam faced bearings on the truck and tongue, respectively, acting to rock the tongue and frame on the axis of the wheels upon turning movements of the truck standard.

5. A tillage implement comprising the combination of a V-shaped frame, tillage tools carried on the arms of said frame, a ground engaging support mounted at the apex of the frame for turning movements on an upright axis, and means for causing the frame to be lifted and lowered on said support by turning movements thereof.

In testimony whereof I affix my signature.

WALTER R. PETERSON.